J. M. BENHAM & G. W. SLATER.
TIRE.
APPLICATION FILED JUNE 7, 1910.
1,008,688.
Patented Nov. 14, 1911.
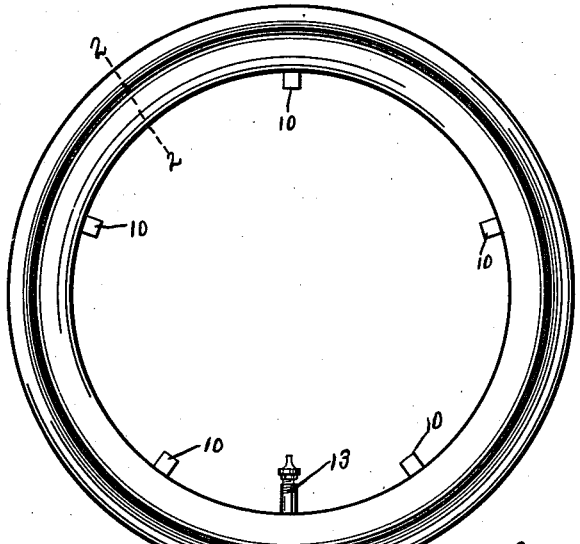
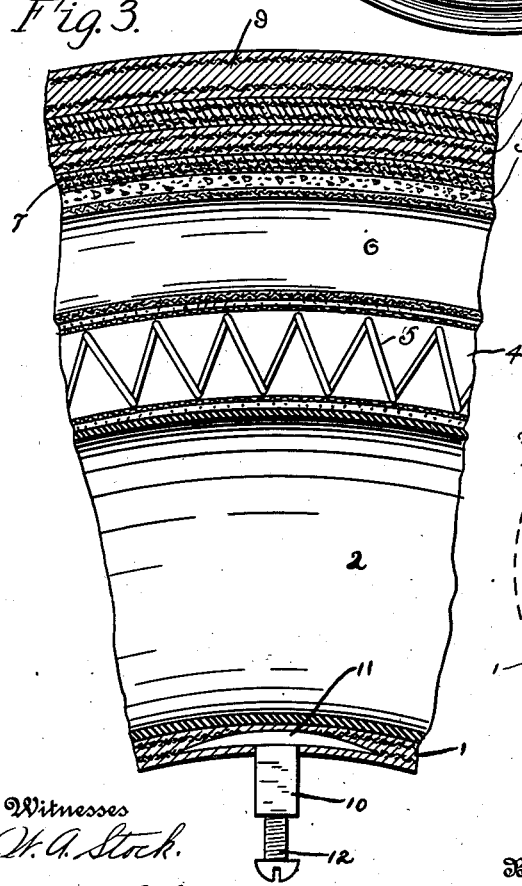
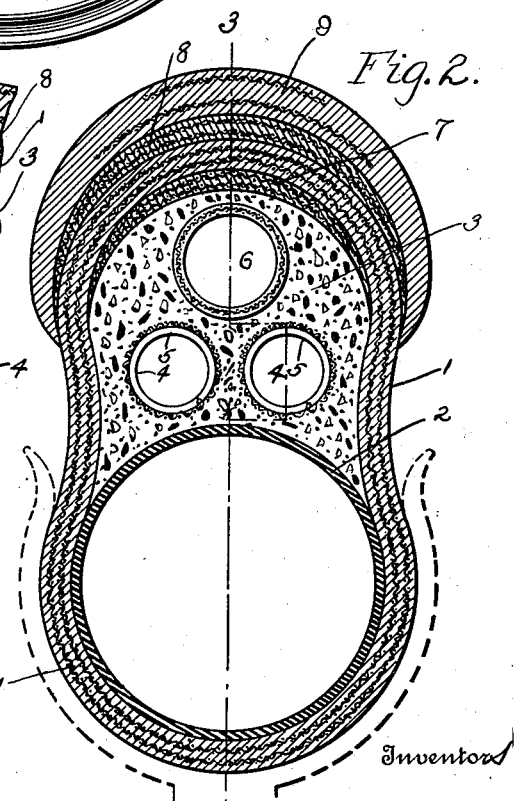
Witnesses
W. A. Stock.
H. C. Schroeder
Inventors
Joseph M. Benham.
George W. Slater.
By E. E. Trooman,
Attorney.

UNITED STATES PATENT OFFICE.

JOSEPH M. BENHAM AND GEORGE W. SLATER, OF OAKLAND, CALIFORNIA.

TIRE.

1,008,688. Specification of Letters Patent. Patented Nov. 14, 1911.

Application filed June 7, 1910. Serial No. 565,492.

*To all whom it may concern:*

Be it known that we, JOSEPH M. BENHAM and GEORGE W. SLATER, citizens of the United States, residing at Oakland, in the county of Alameda and State of California, have invented certain new and useful Improvements in Tires, of which the following is a specification, reference being had therein to the accompanying drawing.

This invention relates to inflatable tires especially adapted for use in connection with motor vehicles and the principal object of the same is to provide a tire in which the inflatable inner tube is protected from punctures, and in which the protective means are cushioned so that expansion and contraction of the same is permitted.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved tire. Fig. 2 is a transverse sectional view taken on the line 2—2, Fig. 1. Fig. 3 is a fragmentary longitudinal sectional view taken on the line 3—3, Fig. 2.

Referring to the accompanying drawings by numerals, it will be seen that the improved tire is composed of a casing 1 that is preferably oval-shaped in cross-section and formed of alternating layers of rubber and fabric which are vulcanized together. An inflatable inner tube 2 is seated in the base of the casing. The outer portion of the casing 1 is provided with a filling 3 of granulated cork and rubber. Parallel tubes 4 are arranged within the filling 3 adjacent the inflatable tube 2, each tube 4 being provided with a spiral spring 5 that normally retains the tubes 4 expanded. Another and preferably larger tube 6 is arranged in the filling 3, said tube being located adjacent the outer portion of said filling and formed of fabric and rubber. Said tube 6 is made heavy so that it will resist a collapsing pressure. A crescent shaped protective strip 7 which is also formed of rubber and fabric is interposed between said filling and the inner surface of the outer end of casing 1. Externally, casing 1 is provided with a crescent shaped sheath 8 that is formed of rubber and fabric, and said sheath is surmounted by the tread 9 that is heavy and formed of rubber and fabric. Lugs 10 have enlarged heads 11 embedded in the base of casing 1, said lugs projecting laterally from said casing and being connected to a wheel felly by the screw 12 or other convenient types of detachable fasteners. The usual inflating nipple 13 extends through the base of casing 1 and communicates with inflatable tube 2.

It will be seen from the foregoing the inner tube 2 is thoroughly protected from punctures by the tread, sheath, filling and the strip 7, and also that the tubes 4 and 6 in the filling, in addition to cushioning the tire, also provides means whereby packing of the filling is prevented owing to the movement imparted to said filling by the expansion and contraction of said tubes incidental to the contact of the tire with the roadway.

What we claim as our invention is:—

A tire comprising a casing, an inflatable tube in the base thereof, a granular filling in said casing, parallel tubes in said filling, expansion springs in said parallel tubes, a cushioning tube also in said filling, a protective strip interposed between said filling and the inner surface of the outer portion of said casing, an external sheath for said casing, and a tread inclosing said sheath.

In testimony whereof we hereunto affix our signatures in presence of two witnesses.

JOSEPH M. BENHAM.
GEORGE W. SLATER.

Witnesses:
H. C. SCHROEDER,
F. P. SCHROEDER.